S. H. AVEN.
SPOOL.
APPLICATION FILED OCT. 4, 1911.
1,052,303.
Patented Feb. 4, 1913.
3 SHEETS—SHEET 1.
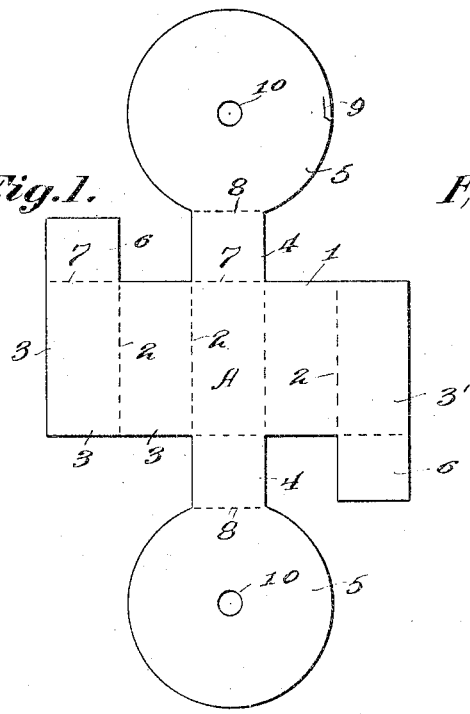
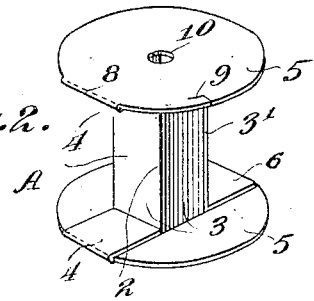
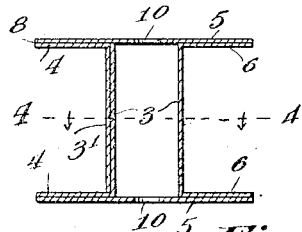
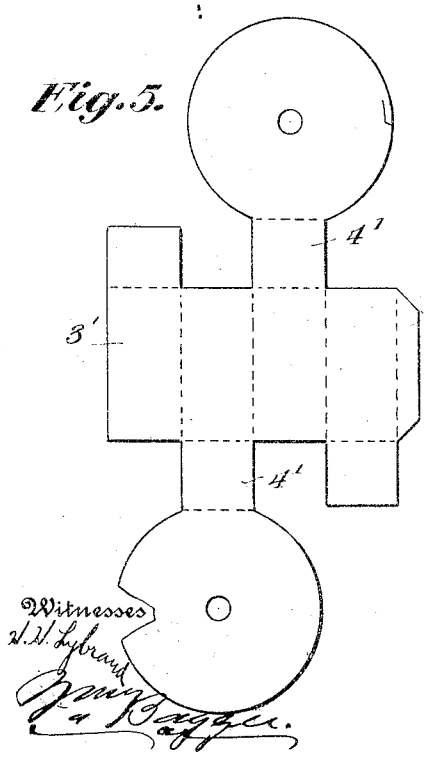
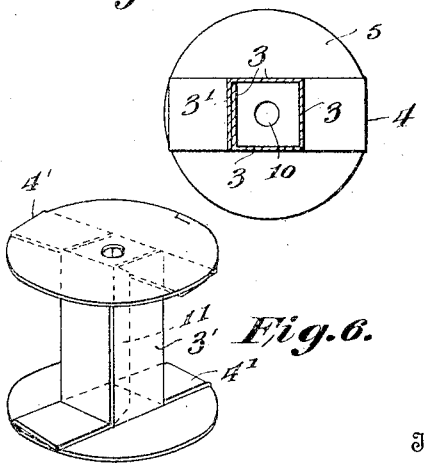
Witnesses
J. N. Lybrand
Inventor
Scottie H. Aven
By Victor J. Evans
Attorney S. H. AVEN.
SPOOL.
APPLICATION FILED OCT. 4, 1911.
1,052,303.
Patented Feb. 4, 1913.
3 SHEETS—SHEET 3.
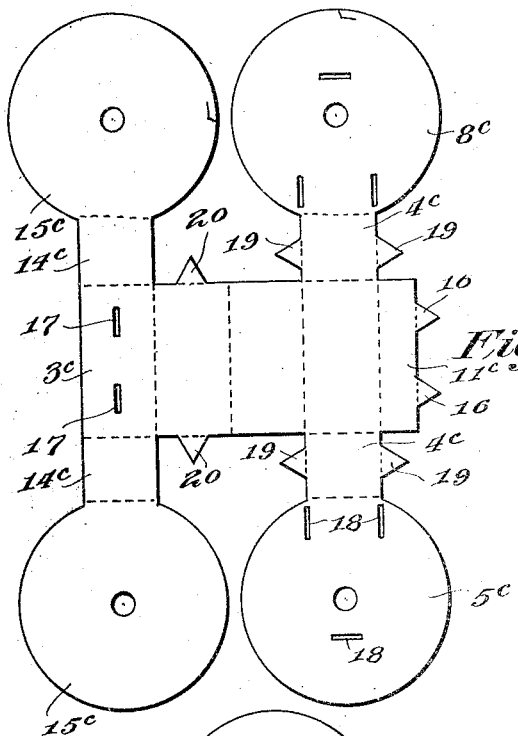
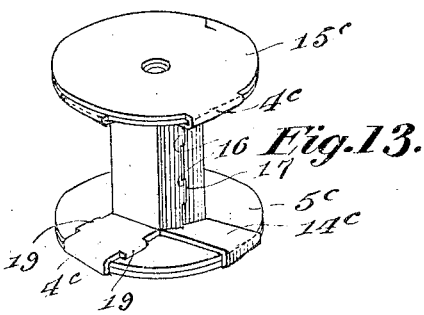
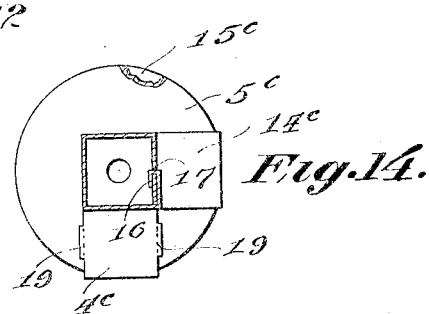
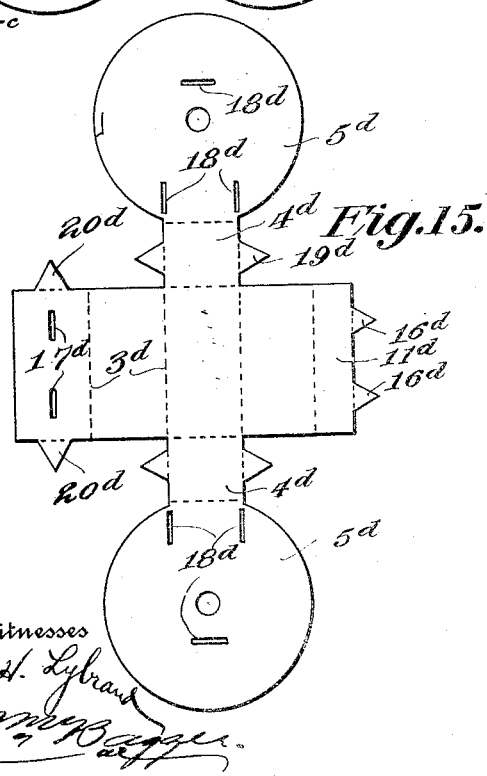
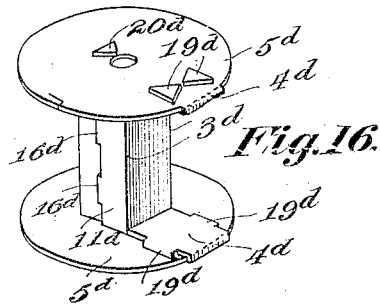
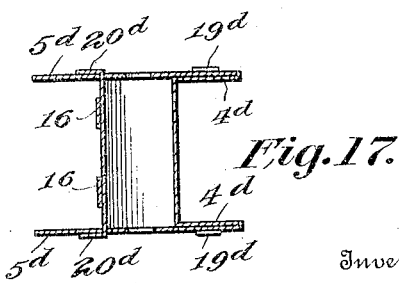
Inventor
Scottie H. Aven
By Victor J. Evans
Attorney
Witnesses

UNITED STATES PATENT OFFICE.

SCOTTIE HILL AVEN, OF BURTON, TEXAS.

SPOOL.

1,052,303.  Specification of Letters Patent.  Patented Feb. 4, 1913.

Application filed October 4, 1911. Serial No. 652,705.

*To all whom it may concern:*

Be it known that I, SCOTTIE HILL AVEN, a citizen of the United States, residing at Burton, in the county of Washington and State of Texas, have invented new and useful Improvements in Spools, of which the following is a specification.

This invention relates to spools for thread, yarn, lace fabrics and the like, and it has for its object to produce a simple, inexpensive and serviceable spool which shall be made from a single integral piece of sheet material, such as cardboard, pasteboard, sheet metal or the like.

A further object of the invention is to produce a spool of the character described which may be readily folded from a single piece of sheet material, the same having been cut to the proper shape and dimensions and scored or indented to facilitate the folding.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 7:
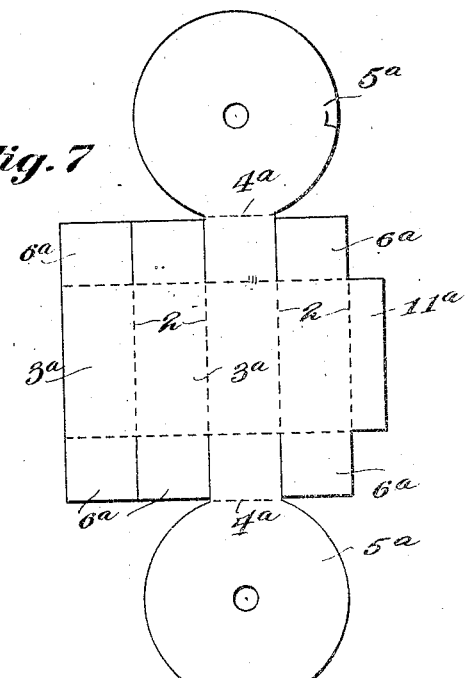
Figure 8:
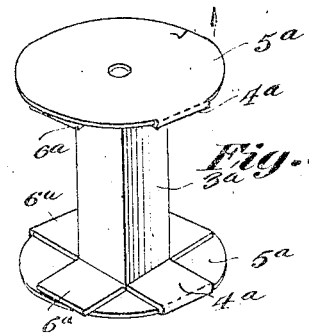
Figure 9:
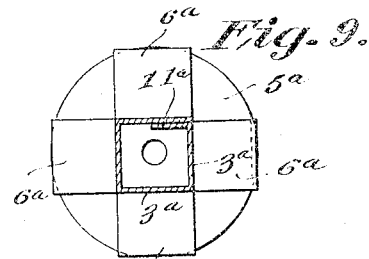
Figure 10:
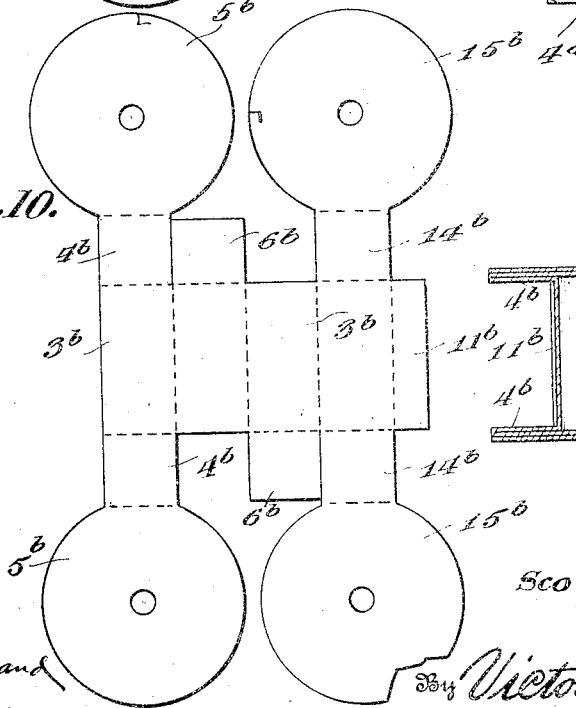
Figure 11:
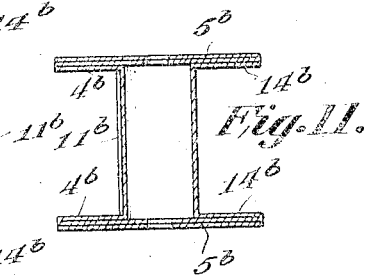

In the drawings,—Figure 1 is a plan view of a blank from which one form of the improved tool may be formed. Fig. 2 is a perspective view of the spool made from the blank shown in Fig. 1. Fig. 3 is a longitudinal sectional view of said spool. Fig. 4 is a transverse sectional view taken on the line 4—4 in Fig. 3. Fig. 5 is a plan view, showing a blank of a slightly modified construction. Fig. 6 is a perspective view of a spool formed from the blank shown in Fig. 5. Fig. 7 is a plan view showing a blank of a further modified construction. Fig. 8 is a perspective view showing a spool formed from the blank shown in Fig. 7. Fig. 9 is a transverse sectional view of the spool shown in Fig. 8. Fig. 10 is a plan view showing a blank of a still further modified construction. Fig. 11 is a longitudinal sectional view of a spool formed from the blank shown in Fig. 10. Fig. 12 is a plan view showing a blank which is preferably formed of sheet metal. Fig. 13 is a perspective view of a spool formed from the blank shown in Fig. 12. Fig. 14 is a transverse sectional view of the spool shown in Fig. 13. Fig. 15 is a plan view showing a sheet metal blank of a modified construction. Fig. 16 is a perspective view of a spool formed from the blank shown in Fig. 15. Fig. 17 is a longitudinal sectional view of the spool shown in Fig. 16.

Corresponding parts in the several figures are denoted by like characters of reference.

The blank A, as shown in Fig. 1, comprises a rectangular body 1 having longitudinally scored or indented lines 2, 2 in the outer face thereof, whereby said blank may be folded to form the four sides 3, 3 of a prism and an overlapping side member 3'. The material constituting one of the side members 3 is provided at the ends thereof with terminally extending lugs 4 having circular projections 5 to form the heads of the spool. The terminal side member 3 and the overlapping side member 3' are each provided with a projecting lug 6, the lugs associated with the said members being disposed at opposite ends of the blank. At the intersection of the lugs 4 and 6 with the body 1 of the blank lines are indented or scored upon the inner face of the blank, as indicated in dotted lines at 7 in Fig. 1. The blank is externally scored, as shown at 8, along the connecting lines of the heads 5 with the lugs 4. After folding the blank along the external scored lines 2, the overlapping flap or side member 3' may be pasted, cemented or otherwise secured upon the side member 3 at the opposite end of the body of the blank. The lugs 4 and 6 are now folded outward from the prismatic body, and the heads 5 are folded down upon the said lugs, as will be clearly seen by reference to Figs. 2, 3 and 4, the heads being secured upon the lugs by means of cement or paste or in any other convenient manner, thus completing the spool. One of the heads 5 is provided with a notch 9 into which the end of a thread may be introduced to fasten the same. Each of the heads 5 may also be provided with a central aperture 10 for the passage of a spindle, when desired. The notch 9 and the apertures 10 may be dispensed with when the spool is to be used for lace or other fabric.

The spool is susceptible of a great many modifications, some of which are illustrated in Figs. 5 to 11, inclusive. Thus, in Fig. 5, the lugs, here designated 4', with which the heads are connected are associated with separate side members 3 instead of being both associated with the same side member, as shown in Fig. 1. In this form a relatively narrow flange 11 is also substituted for the underlapping end member 2, said flange being overlapped by the side member 3' at the opposite end of the body of the blank.

Under the construction illustrated in Figs. 7 to 9, inclusive, the blank is scored or indented longitudinally, as in Figs. 1 and 5, the material between the scored lines being adapted to form the side members 3ª of the prismatic body of the stem and the flange 11ª to be overlapped by and cemented or otherwise secured to the side member at the opposite end of the body. One of the side members is provided with terminal lugs 4ª carrying the head members 5ª, and each of the remaining side members is provided with a terminal lug 6ª adapted to be folded outward for the purpose of supporting the heads of the spool which are cemented or otherwise suitably secured thereto.

Under the construction shown in Figs. 10 and 11, two of the side members, here designated 3ᵇ, are provided with terminal lugs 4ᵇ and 14ᵇ carrying head members 5ᵇ and 15ᵇ. In folding the blank to form the spool, the head members 5ᵇ are overlapped by the head members 15ᵇ, thus forming a particularly strong and durable construction. Some of the side members 3ᵇ are also provided with terminal lugs 6ᵇ adapted to be folded outward to support the heads of the spool.

The construction shown in Figs. 12 to 17 inclusive, is particularly adapted for a sheet metal construction. Sheet metal of any kind, such as light tin, brass or copper plate, aluminum or the like may be used. The construction is substantially like that hereinbefore described, except that integral fastening means are provided.

In Fig. 12 the blank is scored to form the side members 3ᶜ and the underlapping flange 11ᶜ, the latter being provided with tongues or projections 16 adapted to engage slots 17 in the side member overlapping the flange 11ᶜ. Two of the side members 3ᶜ are provided with lugs 4ᶜ carrying circular head members 5ᶜ adapted to be overlapped by the circular head members 15ᶜ carried by the lugs 14ᶜ associated with another side member. The head members 5ᶜ are provided with slots 18 adapted to be engaged by tongues 19 associated with the lugs 4ᶜ and by tongues 20 projecting from the ends of one of the side members 3ᶜ. When the spool is properly folded, as shown in Figs. 13 and 14, it may be secured by projecting the tongues 16 through the slots 17 and the tongues 19 and 20 through the slots 18, after which the tongues may be bent down to firmly secure the parts. The head members 15ᶜ may be simply folded upon the head members 5ᶜ.

Under the construction shown in Figs. 15 to 17, inclusive, only one of the side members, here designated 3ᵈ, is provided with lugs 4ᵈ carrying head members 5ᵈ, said lugs being provided with tongues 19ᵈ to engage the slots 18ᵈ in the head members 5ᵈ, some of said slots being also engaged by tongues 20ᵈ associated with one of the side members 3ᵈ. One of said side members is provided with slots 17ᵈ to be engaged by tongues 16ᵈ associated with the flange 11ᵈ.

It will be readily understood from the foregoing description, taken in connection with the drawings hereto annexed, that the pattern of the improved spool may be greatly varied within the scope of the invention. It is also desired to be understood that any desired means may be utilized for the purpose of securing the parts in position after the folding of the blank to form the spool. Thus, for instance, when the spool is constructed of sheet metal, solder might be used, this being a form of cement, and when the spool is constructed of either cardboard or sheet metal, stapling or riveting may be resorted to when desired.

The improved spool may be manufactured at a very moderate expense, and it will be found extremely useful for the spooling of thread, yarn and various fabrics.

The lugs with which the edges of the heads are connected form radial braces extending from the stem to the outer circumference of the heads which are thereby strongly braced and reinforced.

Having thus described the invention, what is claimed as new, is:—

1. A spool formed of sheet material and comprising a prismatic stem, lugs terminally associated with some of the side members of said stem, and heads integrally connected at their edges with some of the lugs, said heads being folded upon and secured to the lugs with which they are associated and to lugs associated with other side members of the stem, said lugs forming radial braces extending from the stem to the circumference of the head.

2. A spool formed of sheet material and consisting of a prismatic stem, two side members of which are provided with terminal lugs having head members integrally associated therewith at the edges of said head members, said lugs being turned outward from the stem, and said heads being folded thereon and superposed, the lugs constituting radial braces extending from the stem to the circumference of the head.

3. A spool formed of sheet material and comprising a prismatic stem, some of the side members of which are provided with outward extending lugs, some of the lugs having head members integrally associated therewith, said head members being folded upon and having their faces secured to opposed faces of the lugs, the lugs forming radial braces extending from the stem to the circumference of the heads.

In testimony whereof I affix my signature in presence of two witnesses.

SCOTTIE HILL AVEN.

Witnesses:
 T. J. BURTON,
 T. J. AWALT.